April 8, 1924.

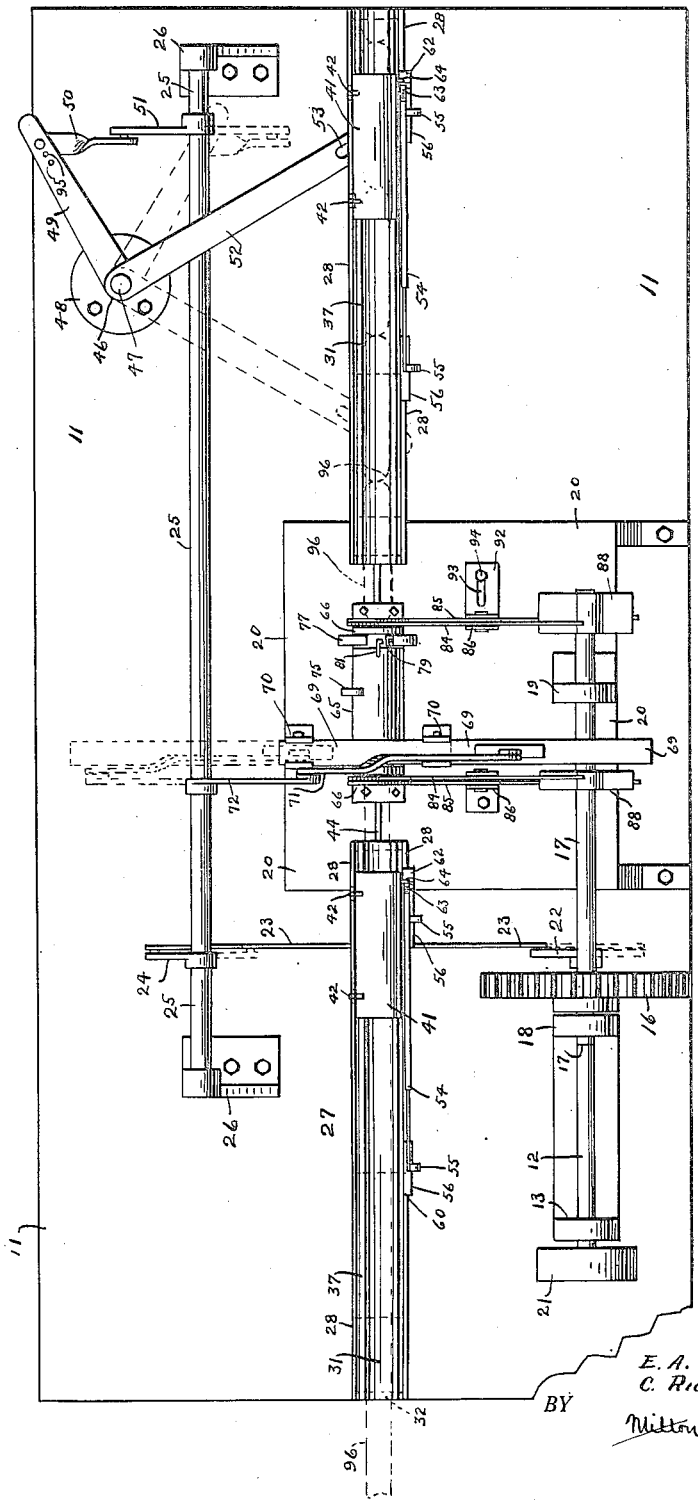

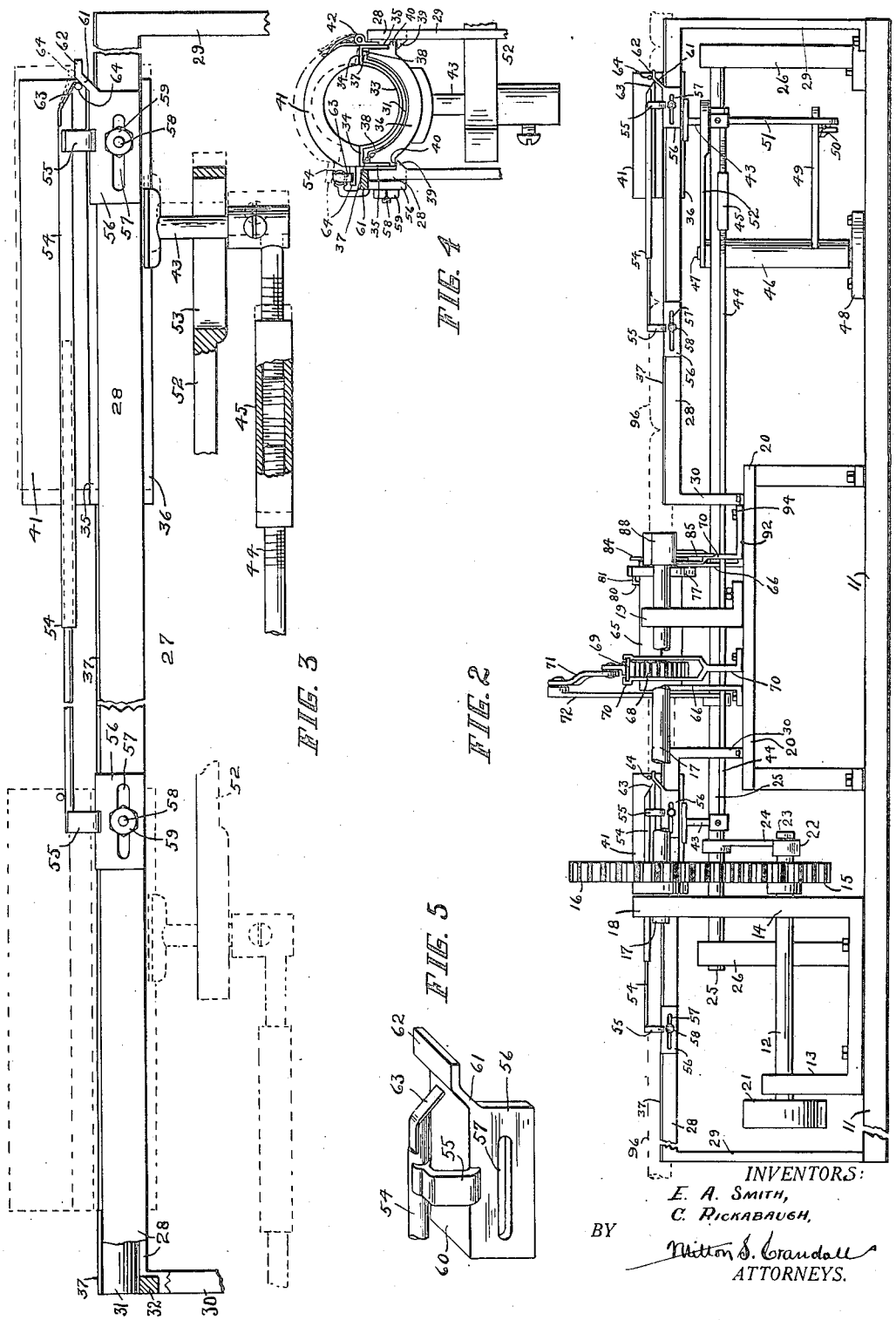

E. A. SMITH ET AL 1,489,792

AUTOMATIC SAUSAGE LINKER

Filed July 22, 1922   3 Sheets-Sheet 3

INVENTORS,
E. A. SMITH,
C. RICKABAUGH,
BY Milton S. Crandall
ATTORNEYS.

Patented Apr. 8, 1924.

1,489,792

UNITED STATES PATENT OFFICE.

ETHAN A. SMITH AND CLAUDE RICKABAUGH, OF LE MARS, IOWA.

AUTOMATIC SAUSAGE LINKER.

Application filed July 22, 1922. Serial No. 576,773.

*To all whom it may concern:*

Be it known that we, ETHAN A. SMITH and CLAUDE RICKABAUGH, citizens of the United States, and residents of Le Mars, in the county of Plymouth and State of Iowa, have invented certain new and useful Improvements in Automatic Sausage Linkers, of which the following is a specification.

Our present invention provides an improved device for making link sausage, the invention having for its principal objects the production of a machine of this type which automatically forms the sausage-stuffed tube or casing into links of uniform length and without in any way injuring the sausage, such a machine being thoroughly efficient and dependable in operation, yet comparatively inexpensive in production.

These and other objects and advantages we successfully attain in the embodiment hereinafter described, defined in the appended claims and illustrated in the accompanying drawings which form a part of this application and in which like characters of reference indicate corresponding parts throughout the several views, of which,—

Fig. 1 is a plan of a machine constructed in accordance with our invention.

Fig. 2 is a front elevation of the same, parts being cut away.

Fig. 3 is an enlarged, fragmentary, front elevation of one of the sausage conveying members and associated parts.

Fig. 4 is an end elevation of the same.

Fig. 5 is a further enlarged perspective view of one of the conveyor grip-releasing members.

Figure 10:
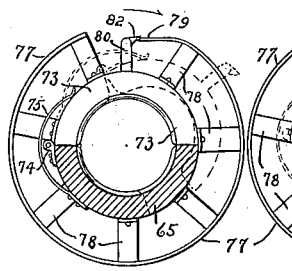
Figs. 9 and 10 are transverse sections of the same taken on the line 9—10 of Fig. 8, showing the twister in relatively different positions.

Referring, now, to the illustrations, we provide a suitable base, 11, on which all of the mechanism is mounted. The driving mechanism includes a shaft, 12, journaled in suitable bearings, 13 and 14, mounted on the base; and carrying a pinion, 15, intermeshed with a spur gear, 16, on a shaft, 17, journaled in a bearing, 18, which may be an extension of the bearing, 14, and a bearing, 19, on a suitable support, as the platform, 20, mounted on the base, 11. The gears, 15 and 16, are so related that the shaft, 12, makes two revolutions to one of the shaft, 17. In practice either of said shafts may be driven in any preferred manner. In the embodiment illustrated we provide the shaft, 12, with a drive pulley, 21, to which may be applied any suitable power. The shaft, 12, carries a crank, 22, connected by a link, 23, with a crank-arm, 24, on a rock-shaft, 25, journaled in suitable bearings, 26.

We provide an elongated two-section support for the stuffed sausage casing having conveying means actuated by the shaft, 25, to intermittently move the sausage longitudinally, mechanism being provided which is actuated by shafts, 17 and 25, to form in each operation a link in that portion of the sausage tube between the conveyor sections.

The sausage supporting means consists of two spaced, aligned sections, represented generally at 27, and each comprising a pair of parallel bars, 28, having at their ends suitable legs, 29 and 30, mounted, respectively, on the base, 11, and support, 20. Between the bars, 28, is a concavo-convex trough, 31, mounted on suitable cross members, 32, carried by the bars, 28; and in which the stuffed sausage casing is supported and slid.

Acting in conjunction with each of the sausage supporting elements, 31, is a sausage conveying element which reciprocates longitudinally of the support, 31, and is automatically controlled to grip and convey the sausage tube on the support, 31, (see particularly Figs. 3 and 4). The said gripping element includes a concavo-convex plate, 33, which rests within and slides upon the support, 31, and is provided with lateral flanges, 34, having their outer edge portions, 35, bent downwardly and secured to the sides of a base member, 36, the upper side of which is concave to conform to and freely fit against the under or convex side of the support, 31. The edge portions of the trough, 31, are preferably provided with lateral flanges, 37, spaces, 38, being provided between the sides of the base member, 36, and the grip flanges, 34, to freely receive the said flanges, 37. The inner sides of the bars, 28, are preferably provided with rails, 39, which slidably support shoulders, 40, on the base member, 36, whereby the sausage gripping element may slide freely upon the support, 31, without undue strain on the gripping element, 33. The gripping element includes a segmental cover, 41, hinged at one side to the lower half of the gripping element, whereby the cover, 41, serves as a jaw which swings toward and from and coacts with the element, 33, to releasably grip the sausage tube. The said jaw, 41, is preferably hinged to the lower grip element by suitable spring hinges, 42, which hold the jaw-cover, 41, yieldably closed.

On the under side of each conveyor grip depends a bolt, 43, the said bolts being rigidly interconnected by a rod, 44, (Figs. 1, 2 and 3), whereby the said conveyor-grips reciprocate in unison. To facilitate accurate spacing between the conveyor-grips, the rod, 44, is preferably formed in two sections, the adjacent end portions of which are oppositely threaded and interconnected by a turnbuckle or sleeve, 45, whereby the rod may be extended or shortened to accordingly increase or decrease the space between the conveyor-grips.

The conveyor-grips are actuated by a bell-crank linkage, energized from the shaft, 25, and preferably consisting of a tubular shaft, 46, rotatable on an upright post, 47, on a base, 48, mounted on the base, 11. The lower end portion of the tubular shaft, 46, carries a crank-arm, 49, connected by a suitable link, 50, with a crank-arm, 51, on the rock-shaft, 25; and the upper end portion of the tubular shaft, 46, carries a radial arm, 52, disposed at right angles to the arm, 49, and provided in its free end portion with a longitudinal slot, 53, receiving the depending bolt, 43, of the adjacent conveyor-grip. The arms, 49 and 52, and their associated parts are so related and connected that the conveyor-grips are thereby caused to travel in each direction a distance equal, approximately, to the length of two sausage links, as will presently be made more clear.

When traveling in one direction the conveyor-grips engage and convey the sausage tube and they are then released from the sausage and retracted. For this purpose we provide each sausage supporting section, 27, with a rail, preferably consisting of telescoping rods, 54, the respective end portions of which are secured to bracket arms, 55, on suitable bearings, 56, mounted on one of the bars, 28, for longitudinal adjustment, as by providing the said bearings with longitudinal slots, 57, through which stud bolts, 58, on the bar, 28, project and have threaded thereon nuts, 59, to engage the bearings and clamp them adjustably to the bar, whereby the rod, 54, may be extended or shortened according to the distance the conveyor-grip travels. The said bearings, 56, are provided with flanges, 60, which rest on the upper edge of the bar, 28. The end portion of the said flange, 60, of one of the bearings is extended and upwardly inclined, as at 61, and terminates in a horizontal part, 62, a distance from the the adjacent end of the rail, 54, the said end of the rail, 54, being provided with an upwardly yieldable tongue, 63, which declines oppositely to and above the guide, 61. The free side of the conveyor grip-jaw, 41, is provided with a projection, 64, positioned thereon to travel below the rail, 54, when the conveyor-grip is operatively engaged with the sausage. For example, when the grip travels from the left to the right, in Fig. 3, it will be engaged with and carry the sausage upon the support, 31, the stud, 64, being below the rail, 54, and as the grip approaches the extremity of its stroke, the stud, 64, engages and raises the tongue, 63, finally resting on the projection, 62, at the end of the stroke; then as the grip is retracted it is released from the sausage by virtue of the stud, 64, being guided by the tongue, 63, onto the rail, 54, thereby holding the grip-jaw, 41, from the sausage, as indicated in dotted lines in Fig. 4, and as the grip reaches the other extremity of its stroke the stud, 64, leaves the adjacent end of the rail, 54, permitting the grip to re-engage the sausage at another point.

Figure 9:
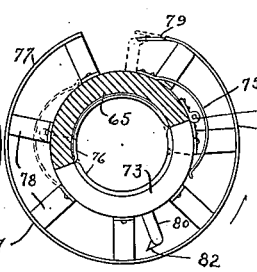
Figure 8:
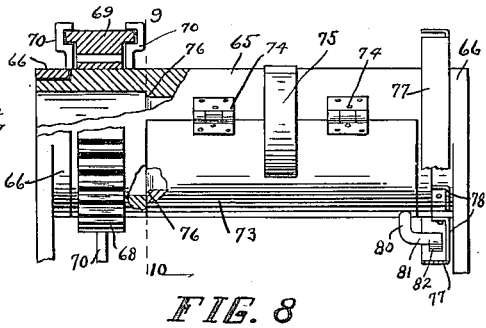
Fig. 8 is an enlarged, front elevation of the link twister.
Figure 7:
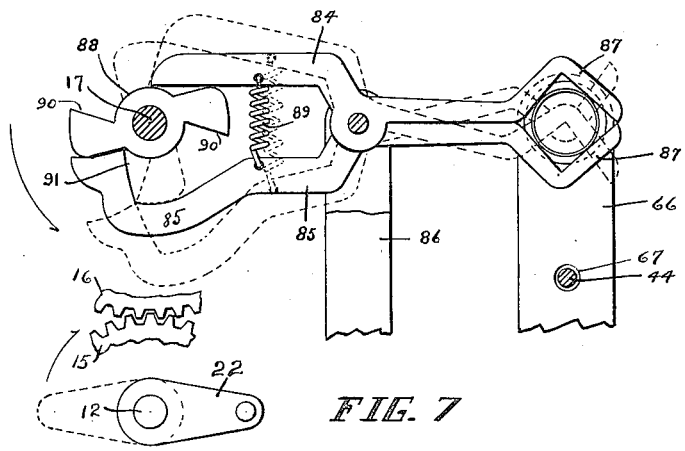
Fig. 7 is an enlarged, side elevation of one pair of the sausage pincers and associated parts.

Between and aligned with the sausage supporting section is a rotatable member which releasably grips and twists the sausage to form the links, such member consisting, preferably, of a cylindrical tube, 65, journaled in suitable bearings, 66, on the platform, 20, and having openings, 67, through which the rod, 44, reciprocates (Fig. 7). The cylinder, 65, is reciprocally rotated by means of a spur-toothed ring, 68, thereon engaged with a rack, 69, slidable in suitable bearings, 70, on the platform, 20, and connected by a pitman, 71, with a crank-arm, 72, on the shaft, 25. The cylinder, 65, is provided with a segmental door, 73, hinged at one side, as at 74, to the cylinder to swing outwardly and inwardly adapting the door as a jaw to coact with the diametrically opposite portion of the cylinder to releasably grip the portion of the sausage tube therewithin, means being provided to hold the said jaw, 73, yieldably closed, as by a leaf spring, 75, having one end portion fixed to the cylinder wall and the free end portion engaged with the jaw (see Figs. 8–10). The internal radius of the jaw, 73, and the diametrically opposite portion of the cylinder, as indicated at 76 in Fig. 8, is less than the internal radius of the end portions of the cylinder, whereby the sausage tube may be drawn freely through the cylinder when the jaw, 73, is released therefrom.

The jaw, 73, is controlled by a fixed open band, 77, arranged coaxially with and spaced from the cylinder, 65, by radial arms, 78, secured to one of the bearings, 66. The band, 77, is of yieldable material, and one end portion, 79, thereof is yieldable outwardly. On the adjacent edge of the jaw, 73, is a radial projection, 80, having a laterally extending part, 81, having a lug, 82, traveling within the band, 77, while the cylinder is making one revolution in the direction indicated by the arrow in Fig. 9 with the jaw, 73, in engagement with the sausage tube; then when the cylinder starts to rotate in the opposite direction, as indicated by the arrow in Fig. 10, the lug, 82, is guided onto the periphery of the band, 77, through the end portion, 79, of the band whereby the jaw, 73, is held from the sausage tube, permitting the cylinder, 65, to rotate freely around the sausage tube. This revolution being completed, the lug, 82, passes from the fixed end of the band and the jaw, 73, is permitted to re-engage the sausage tube.

Coacting with the twisting cylinder, 65, to form the sausage links are pincers positioned adjacent the opposite ends of the cylinder, governed by the shaft, 17, and each comprising bars, 84 and 85, pivoted together on a suitable bearing, 86, on the platform, 20. Gripping end portions of the said bars are provided with oppositely disposed V-shaped jaws, 87, so arranged and related that when they are closed, as shown in dotted lines in Fig. 7, their apexes will be aligned substantially with the axis of the cylinder, 65. The other end portions of the bars, 84 and 85, are positioned, respectively, above and below a cam, represented generally at 88, mounted on the shaft, 17, one of said cams being provided for each pair of pincers. The jaws, 87, are held yieldably open by a retracting spring, 89, secured to the bars, 84 and 85. As previously stated, the speed ratio of the shafts, 12 and 17, is two to one. Therefore, by referring to Fig. 7 it will be clear that when the crank, 22, makes a half revolution to the position indicated in dotted lines in Fig. 7 to impart a complete rotation to the cylinder, 65, to grip and twist the sausage and retract the conveyor-grips in disengaged position, it will at the same time impart a quarter revolution in the opposite direction to and cause the cams, 88, to coact with the pincers to contract the sausage tube at opposite ends of the cylinder, 65, while the latter is twisting that portion of the sausage tube therewithin to form a sausage link. Inasmuch as the jaws, 87, must be instantly opened upon completion of the first half revolution of the crank, 22, in order to permit longitudinal movement of the sausage tube through the cylinder, 65, during the second half revolution of the said crank, we extend the arm, 84, to approximately the vertical plane of the axis of the shaft, 17, and cut away the faces of the arms of the cams, as at 90, to permit the instant disengagement of the arm, 84, from the cam when the latter has completed its quarter revolution, as indicated in dotted lines in Fig. 7; while the arm, 85, is extended beyond the shaft, 17, and formed with an abruptly recessed part, 91, which permits the arm, 85, to also be instantly retracted when the cam has completed its quarter revolution, all as clearly indicated in dotted lines in Fig. 7. As it is preferred that such a device be adjustable to link the sausage in various lengths we so mount one pair of the pincers that it may be adjusted toward and from the other pair. For this purpose we provide one of the pincer bearings, 46, with an elongated base, 92, having a slot, 93, receiving the bolt, 94, which clamps the bearing to the platform, 20, whereby the pincers pivoted thereon may be adjusted toward and from the cylinder, 65, the associated cam, 88, being relatively broader than its companion to afford such adjustment of the pincers. In order to vary the distance of travel of the conveyor-grips in accordance with the length of the sausage links the crank-arm, 49, is provided with a plurality of openings, 95, whereby the sweep of the arm 52, may be altered by pivoting the link, 50, in the appropriate opening, 95.

Figure 6:
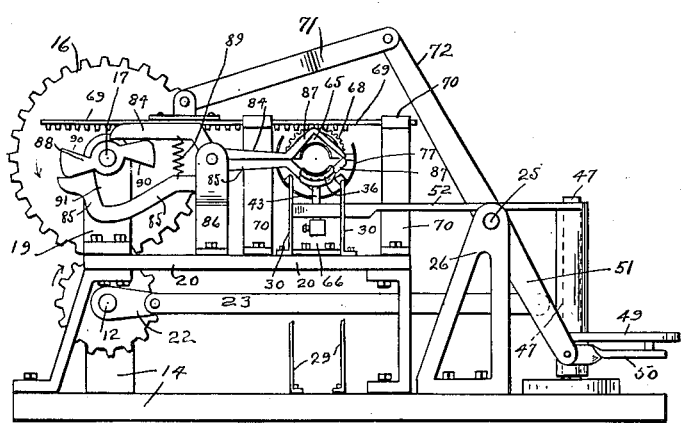
Fig. 6 is an end elevation of Figs. 1 and 2, parts being cut away.

By reference to Figs. 1, 2 and 6, it will now be clear that the stuffed sausage casing, represented in dotted lines at 96, rests in the troughs, 31, and extends through the twisting cylinder, 65, with the cylinder jaw, 73, engaged with the sausage, the pincer jaws, 87, open and the sausage conveyor-grips disengaged from the sausage; then, with the first half revolution of the shaft, 12, the pincers contract the sausage tube while a complete revolution is imparted to the twisting cylinder to form the link, and the conveyor-grips are shifted to the opposite ends of their strokes, the conveyor parts, 33, sliding freely under the sausage tube; then, instantly upon the completion of the said half revolution of the shaft, 12, the pincers are instantly opened, the conveyor-grips re-engaged with the sausage tube, the cylinder jaw, 73, opened, the cylinder retracted and the sausage tube moved in the trough the distance of two links, and the operation repeated.

Although we have illustrated and herein described but one embodiment of our invention, we would not be limited to such specific construction, for various alterations and modifications may be made in the details of construction and arrangement of parts herein disclosed without departing from the spirit and scope of the invention as defined in the appended claims.

Claims:

1. A sausage-linking machine embodying a sausage-supporting guide, link-forming means comprising a rotating cylinder to freely encircle the sausage, a segmental jaw carried thereby to coact with the cylinder to releasably grip the sausage, means for intermittently releasing the jaw and cylinder, members at the ends of the cylinder for releasably impinging the sausage while said cylinder and jaw are gripped, and means for intermittently conveying the sausage on the guide.

2. A sausage-linking machine embodying a sausage-supporting guide, link-forming means comprising a reciprocally rotating cylinder to freely encircle the sausage, a segmental jaw carried thereby to coact with the cylinder to releasably grip the sausage, means for releasing said jaw while the cylinder is rotating in one direction, members at the ends of the cylinder for releasably impinging the sausage while said jaw is gripped, and means conveying the sausage on the guide when the jaw is released.

3. A sausage link former consisting of a cylinder through which the sausage tube passes and having a segmental jaw to releasably grip the sausage, bearings in which the cylinder is rotated, and means for impinging the sausage tube at opposite ends of the cylinder.

4. A sausage link former consisting of a rotating cylinder to freely encircle the sausage tube and having a segmental jaw to releasably grip the sausage, members at the ends of the cylinder releasably impinging the tube, and means for intermittently releasing said jaw and members.

5. A sausage link former consisting of a rotating cylinder to freely encircle the sausage tube and having a segmental jaw to releasably grip the sausage, members at the ends of the cylinder releasably impinging the tube, means for intermittently releasing said jaw and members, and mechanism for moving the tube longitudinally when said jaw and members are released.

In testimony whereof, we have hereunto set our hands this 20th day of July, 1922.

ETHAN A. SMITH.
CLAUDE RICKABAUGH.